United States Patent [19]
Moryl et al.

[11] Patent Number: 4,531,870
[45] Date of Patent: Jul. 30, 1985

[54] DEVICES FOR SECURING OBJECTS TO METAL SHEETS ACCESSIBLE FROM ONLY ONE SIDE

[75] Inventors: Richard Moryl, Eaubonne; Roger Bouery, Valmondois, both of France

[73] Assignee: Compagnie de Materiel et D'Equipements Techniques, Senlis, France

[21] Appl. No.: 324,950

[22] Filed: Nov. 25, 1981

[30] Foreign Application Priority Data

Dec. 1, 1980 [FR] France .................... 80 25481

[51] Int. Cl.³ ............................................. F16B 37/04
[52] U.S. Cl. ....................................... 411/108; 24/453; 24/590; 411/111
[58] Field of Search ............... 411/15, 182, 36, 103, 411/105, 108, 340, 349, 111, 172, 173, 182, 549–555; 292/212, 256.73, 256.75; 24/221 R, 221 P, 211 P, 590, 453

[56] References Cited

U.S. PATENT DOCUMENTS

| | | | |
|---|---|---|---|
| 811,163 | 1/1906 | Morsier | 411/15 |
| 832,093 | 10/1906 | Stoltzfus | 292/212 |
| 1,800,176 | 4/1931 | Carr | 411/15 |
| 3,082,807 | 3/1963 | Tinnerman | 411/15 |
| 3,109,342 | 11/1963 | Disley | 411/15 |
| 3,783,922 | 1/1974 | Petrus | 411/111 |
| 3,785,421 | 1/1974 | Launay | 411/108 |
| 3,975,804 | 8/1976 | Schenk | 411/555 |
| 4,250,732 | 2/1981 | Moryl | 411/108 X |
| 4,262,394 | 4/1981 | Wright | 411/349 X |
| 4,303,361 | 12/1981 | Moryl et al. | 411/108 |
| 4,395,062 | 7/1983 | F'Geppert | 292/256.75 X |

FOREIGN PATENT DOCUMENTS

0077695  4/1983  European Pat. Off. ............ 411/103

Primary Examiner—Robert L. Wolfe
Assistant Examiner—Lloyd A. Gall
Attorney, Agent, or Firm—Cushman, Darby & Cushman

[57] ABSTRACT

There is provided a means for fixing an object to a blind metal sheet (1) by fitting into a square hole (2) provided in this metal sheet, a cage (3) containing a threaded part (7), then by causing a complementary threaded part to coact with this part. The hole is square, the cage has the shape of an octagonal prism provided laterally with four longitudinal windows (8) and the threaded part comprises four radial tabs (9) adapted to slide jointly in said windows (8), means being provided, such as thinned-down portions (12), for making possible a rotation through 45° of said part (7) after its axial introduction with the cage into said hole (2).

6 Claims, 13 Drawing Figures

DEVICES FOR SECURING OBJECTS TO METAL SHEETS ACCESSIBLE FROM ONLY ONE SIDE

BACKGROUND AND SUMMARY OF THE PRESENT INVENTION

The present invention relates to devices for securing objects onto supports, such as "blind" metal sheets, i.e. sheets accessible from only one side and perforated with appropriate holes through which the devices in question partially pass. Such devices are frequently required in the field of bodywork for road, rail, airborne vehicles or the like in addition to the domestic art or metal furniture field.

The present invention relates more particularly, among the fixing devices of the kind in question, to those devices which comprise a one-piece cage containing at least a partially threaded part which threadingly cooperates with a complementary threaded part to provide the desired securing functions. The cage includes a socket, a cylindrical or prismatic section small enough to be introduced into the fitting holes of the metal sheet or similar support. One of the ends of the socket is extended transversely with a collar adapted for bearing on the edges of the holes when the socket is introduced therein.

Known securing devices of this type present a number of advantages. In general, however, such known devices require complicated shapes for the fitting holes, each hole having the shape of an elongated slit with parallel edges or else that of a circle having notches radially outwardly extending therefrom.

One object, among others, of the present invention is to alleviate this requirement of such known devices by providing square-shaped holes for the securing devices.

In accordance with the present invention, the securing devices include a threaded part which comprises four identical radial tabs extending in two directions diametrically perpendicular with respect to one another and having a profile which is such that the cross thus defined may be introduced with very little clearance into the square holes.

Furthermore, the socket forming the cage thereof has a transverse section inscribable in a regular octagon and is itself adapted to being introduced with a slight clearance into the square holes. The socket is cut away so as to form four identical longitudinal windows offset angularly by 90 degrees with respect to one another. Each of the longitudinal windows is adapted to jointingly receive one of the four tabs of the threaded part. Means are also provided for enabling the threaded part to rotate through 45° in the direction in which the complementary threaded part is threaded thereon between the time when the threaded part is introduced into a respective square hole and at least the end of the threading interengagement of the complementary threaded part with the partially threaded part.

In preferred embodiments, one or more of the following structural arrangements can be advantageously utilized.

Furthermore, when a socket has the general shape of a prism with an octagonal base, the means for enabling the threaded part to rotate through 45° may include thinned-down portions provided in only one of the two halves of each of the four non-cutout portions of the lateral wall of the socket.

In another embodiment, when the socket has the general shape of a prism with an octagonal base, the means for enabling the threaded part to rotate through 45° may include rounded cylindrical areas centered on the axis of the socket on the outer face of the non-cutout lateral wall portions thereof. Such areas preferably extend over half of each of those portions when viewed from a peripheral direction.

The means for enabling the threaded part to rotate through 45° may also include oblique ribs provided on the outer faces of the non-cutout portions of the side wall of the socket. Such ribs are adapted to cooperate with the edges of the square holes so as to drive the socket angularly during its axial introduction into such a hole and to cause it to be automatically oriented at an angle of 45° during this introduction.

Still a further embodiment contemplates that the means for enabling the threaded part to rotate through 45° may be formed by the inclined shape given to the four windows cut out in the socket so that when the tabs of the threaded part slide along these windows subsequent to the threading engagement of the complementary threaded part thereon, the threaded part is oriented at an angle of 45°.

The collar preferably comprises at least two elastically flexible wings bent on the side of the socket and adapted to resiliently bear against the metal sheet in which the square hole is provided. The cage preferably comprises two flat bosses, triangular in cross-section, which axially project under the collar. Each boss is adapted to be jointingly introduced in two opposite corners of the square hole after the threaded part and the cage which contains it have rotated through 45° subsequent to their common axial introduction thereinto.

The invention comprises, in addition to those features noted above, certain other features which are preferably used at the same time and which will be more explicitly discussed hereafter.

BRIEF DESCRIPTION OF THE ACCOMPANYING DRAWINGS

In what follows, preferred embodiments of the present invention will be described with reference to the accompanying drawings in a way which is, of course, nonlimiting.

FIGS. 1 and 2 respectively show a side view having the metal sheet in section and a transverse view along line II—II of FIG. 1, the assembly of a metal sheet in which a square hole is cut out and a securing device constructed in accordance with the present invention, the securing device shown in the process of being fitted into the square hole;

Figure 4:
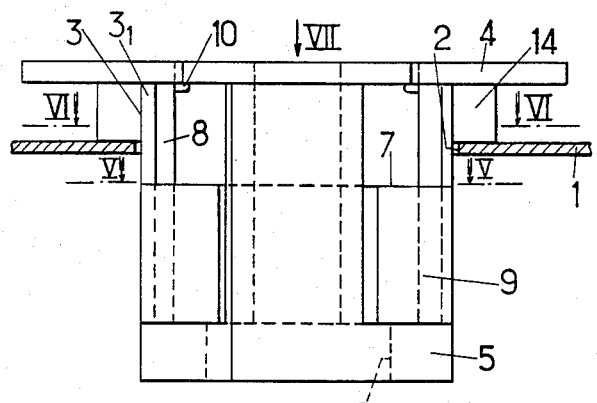
FIG. 4 shows, similarly to FIG. 1, another embodiment of such an assembly in accordance with the present invention.
Figure 7:
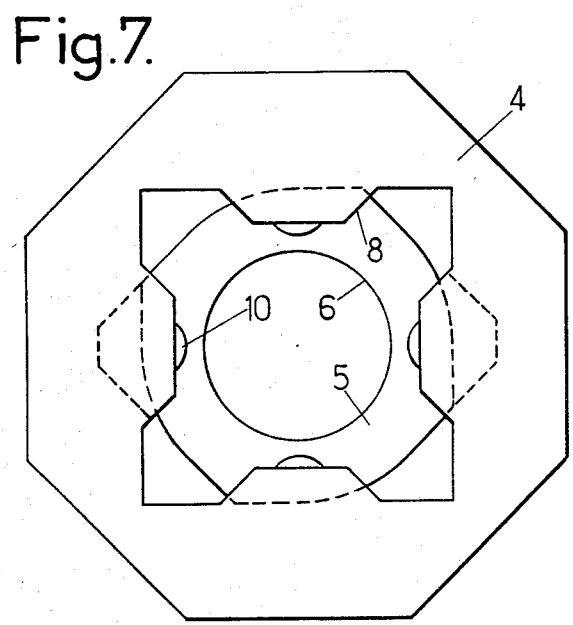
Figure 12:
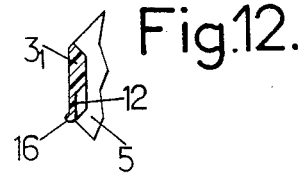
Figure 13:
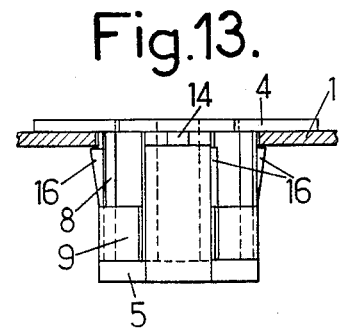
Figure 10:
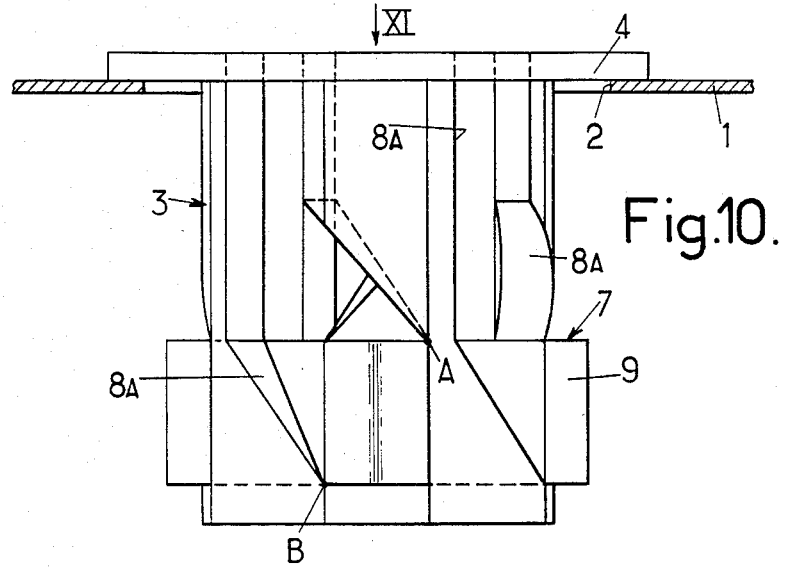
Figure 11:
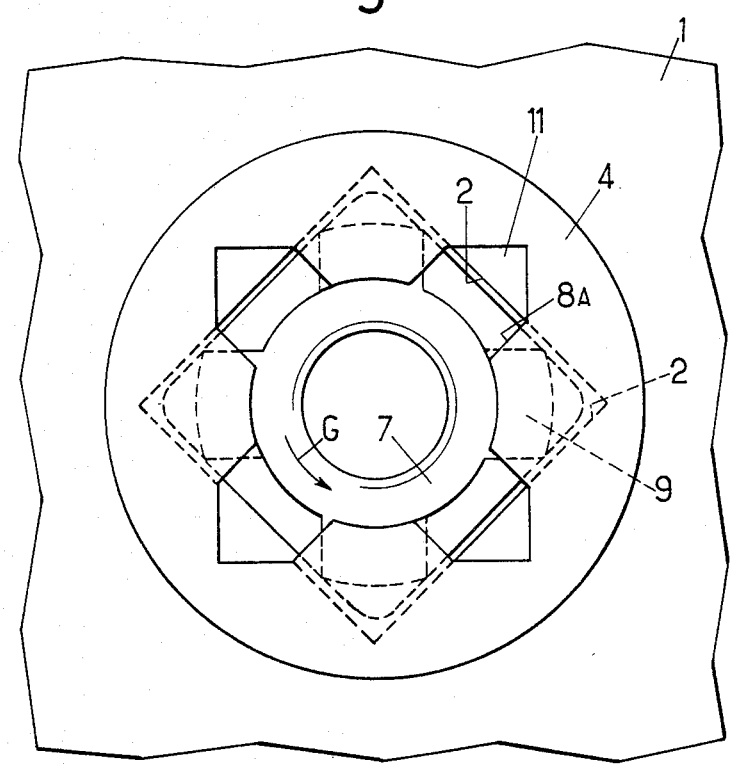

FIGS. 10 and 11 respectively show a side view having the metal sheet in section and an end view taken in the direction of arrow XI of FIG. 10, of yet another embodiment of an assembly of a drilled metal sheet and a securing device in accordance with the present invention fitted in a hole in the metal sheet; and FIGS. 12 and 13 illustrate another embodiment of the socket generally shown in FIGS. 4 and 7, this socket being shown respectively in partial cross-section and in a side view.

DETAILED DESCRIPTION OF THE PREFERRED EXEMPLARY EMBODIMENTS

In each embodiment, the metal sheet 1 in which a securing device of the present invention is to be equipped is provided with a square hole 2. The securing device generally comprises a one-piece cage formed of a cylindrical or prismatic socket 3 and a collar 4 extending transversely at one end of the socket. The other end of the socket is closed by a bottom 5 and is preferably drilled at its center to provide a circular hole 6. Threaded part 7, at least a portion of which is housed in socket 3, is adapted to threadingly cooperate with a complementary threaded part (not shown) to effect the desired securing functions.

The cage is generally formed from a sufficiently hard and resilient plastic material such as polyamide, but it could also be made from metal.

The cross-section of socket 3 is outwardly defined by a regular octagon which is configured and sized to permit slight play with respect to hole 2. Four of the eight lateral faces of the socket are cut out to provide four identical longitudinally elongated windows 8 and are offset angularly with respect to each other by 90° about the axis of the socket. The widths of windows 8 are almost as large as those of the faces from which they are cut out.

Figure 2:
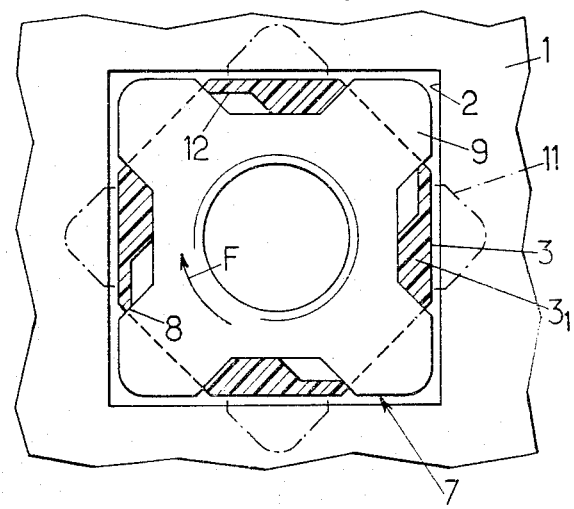
Figure 3:
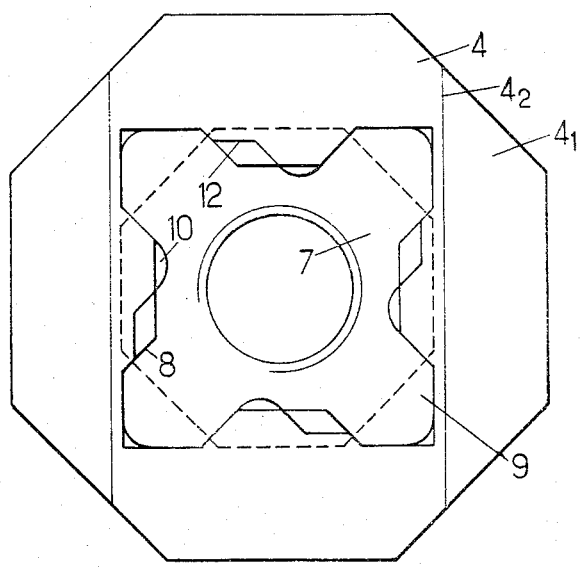
FIG. 3 shows an end view of the same device taken in the direction of arrow III in FIG. 1.

The threaded part 7, which is a screw-nut or stud-bolt, is generally made from metal but could also be made from a sufficiently hard plastic material. Threaded part 7 comprises four identical radial tabs 9 offset angularly with respect to each other by 90° so as to form a cross. Each of tabs 9 is dimensioned so as to jointingly pass through one of the windows 8. Additionally, each end of tabs 9 is in the general shape of a right-angled dihedron so that the cross formed by tabs 9 may be fitted with slight play into the square hole 2. The solid angle of intersection of each endmost dihedron is preferably chamfered or rounded as can be seen in FIGS. 2 and 3.

The cross formed by tabs 9 is limited by two transverse planes and it extends over the entire axial thickness of the threaded part 7 if the latter is a screw-nut. If threaded part 7 is a stud-bolt, the cross in question simply forms the head of the stud-bolt. Windows 8 for guiding the axial sliding of tabs 9 are cut out as far as the end of socket 3 opposite its bottom 5. The threaded part 7 defining the cross may then be axially fitted into the socket through this end.

To prevent accidental axial disengagement of threaded part 7 from the socket, pins 10 are advantageously provided and project slightly inside the socket substantially at the level of collar 4. These pins 10 and/or the wall portions which surround them are slightly deformed radially by threaded part 7 during its introduction into the socket. It is at such time that the pins 10 form an obstacle to the accidental escape of threaded part 7 by virtue of their resilient return to the rest position.

It follows from the above discussion that the securing device formed by the cage and by the cross-head threaded part 7 which it contains defines a substantially square transverse contour (see FIG. 2) slightly smaller than the square edge of hole 2 at the level of threaded part 7. The device may thus be easily axially introduced into hole 2.

To ensure that desired securement functions with the device of the present invention, the cross must be rotated through 45° so that when threaded part 7 is clamped by its threaded engagement to the complementary threaded part, the ends of its four tabs 9 axially bear against the middle of the areas of the metal sheet 1 which are adjacent to the four sides of the square hole 2. These areas have been shown schematically by a dot and a dash line under the reference numeral 11 in FIG. 2.

Numerous methods may be envisioned for enabling this rotation of the cross through 45°, and only through 45°.

Figure 1:
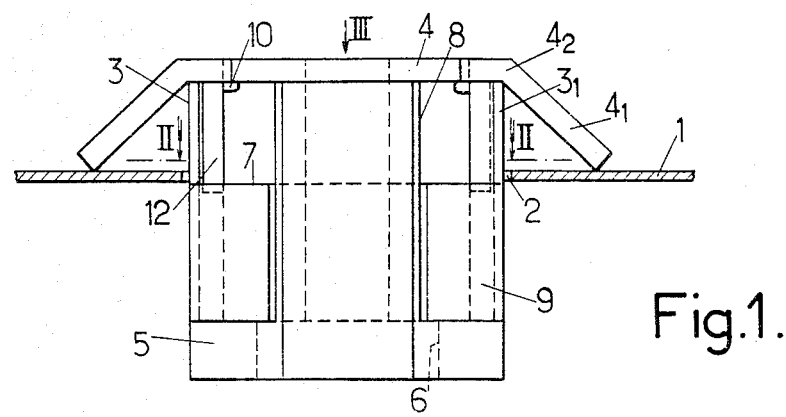

In the embodiments of FIGS. 1 to 3, one half of each of the four walls $3_1$ of socket 3 defining windows 8 has been thinned down for this purpose in the axial vicinity of collar 4. The thinned-down half is located in the zone of each wall which comes into contact with a side of the square hole 2 to define an engagement surface when the assembly 3, 7 is urged in the screwing direction from the open end of the socket. The hollows forming these thinned-down portions have been designated by the reference numeral 12 in FIGS. 1 to 3.

Thus, it is possible to cause the device to rotate in the indicated screwing direction, i.e. in the clockwise direction in FIG. 2 (arrow F), with a slight radial flexion of the thinned-down portions of the socket, which are located for this purpose at a sufficient axial distance from the zone of the socket occupied by part 7. This movement is automatically stopped when the angular amplitude thereof reaches 45° by the angular abutment of the thick portions of walls $3_1$ against the sides of the square hole 2. The part is then in a position to permit the desired threaded securement to occur.

It is sufficient to this end to place on collar 4 the element which one desires to secure to the metal sheet 1 by aligning an aperture in the element with the axis of the socket, then screwing the complementary threaded part from the outside on part 7, one of these two parts then passing through the aperture. This screwing movement draws part 7 axially closer to metal sheet 1 until its tabs 9 come into axial abutment against areas 11 of the metal sheet, as was explained above. This axial application is spread out over a relatively large surface and evenly distributed about the axis of the assembly, which ensures very firm attachment of part 7 and also of the element to be fixed to metal sheet 1.

In the embodiment of FIGS. 1 to 3, collar 4 comprises two wings $4_1$ bent in the direction of metal sheet 1 and capable of resiliently flexing about their bending lines $4_2$. This arrangement presents the advantage of automatically cancelling out the fitting clearances because the resilient application of the edges of wings $4_1$ against the outer face of metal sheet 1 provides a resilient axial force to be applied by tabs 9 against the other face of metal sheet 1. Such a force is applied even in the waiting position of the device, that is to say, after it has been positioned on the metal sheet but before it is used to secure an element for which it is designed. This arrangement also allows the device to be fitted to metal sheets of very different thicknesses, an increase in the thickness of the metal sheet resulting simply in a reduction of the bending angle of wings $4_1$.

With such a construction, the fitting of the device into the square hole 2 requires an axial thrust to be exerted on the cage during the final phase of the axial introduction of this device into hole 2 so as to slightly crush the collar 4 by causing flexion of its wings 4 to occur. Such a thrust may be maintained during the subsequent rotation of the device through 45°. During clamping securement, the wings $4_1$ are crushed due to the cooperation of part 7 with the complementary threaded part until they are in the transverse extension of the central zone of collar 4.

In each of the embodiments illustrated in FIGS. 4 to 11, the reference numerals identical to the preceding ones designate the same elements or parts of the elements as previously described. The embodiment of FIGS. 4 to 7 differs from that of FIGS. 1 to 3 by two arrangements.

Figure 5:
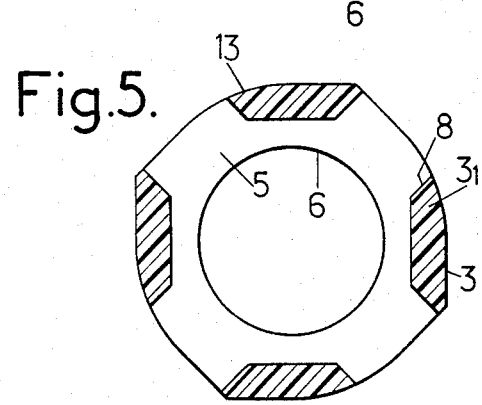
FIGS. 5 and 7 show the corresponding cage alone, in cross-section taken along line V—V of FIG. 4 and an end view taken in the direction of arrow VII of FIG. 4, respectively.
Figure 6:
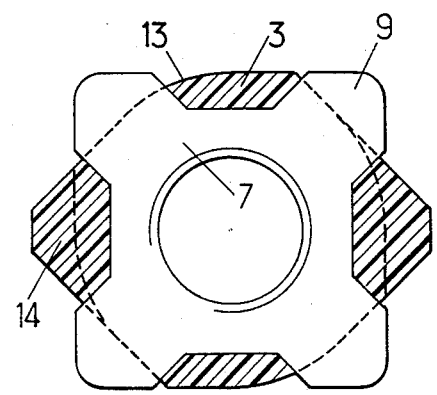
FIG. 6 is a section of the securing device of FIG. 4 taken along line VI—VI therein.

In a first arrangement, illustrated in FIGS. 5 to 6, the rotation of the device through 45° after its axial introduction into the square hole 2 is not accomplished by thinning down one-half of each wall $3_1$ of the socket, but rather by providing on the external face of this half a cylindrical shape centered on the axis of the socket 3, as can be seen at 13.

According to the second arrangement, the collar 4 no longer comprises flexible wings but rather two bosses 14 projecting radially outwardly of the socket 3 in the axial vicinity of collar 4. The outer profile of these bosses 14 has the same right-angled dihedron shape as that of the ends of tabs 9, with a bevelled or rounded solid angle of intersection. This shape, however, is slightly larger for the bosses 14 than for the tabs 9 so that the former may cooperate without play with two diagonally opposite corners of the square hole 2. Furthermore, these bosses 14 are offset by 45° about the axis of the cage with respect to tabs 9 (see FIG. 6).

With the above construction, the positioning of the cage on the metal sheet takes place in three stages. First, the cage containing threaded part 7 is axially introduced into square hole 2 with the contour of the cross-head of part 7 orientated parallel to the contour of hole 2 until the bosses 14 come into axial abutment against the outer face of metal sheet 1. Then, the assembly of the cage and the cross-head part 7 is rotated through 45° which brings the bosses 14 axially opposite two diagonally opposite corners of hole 2. Finally, these two bosses are axially introduced into these two corners of hole 2.

This latter axial introduction is not easily reversible since the bosses 14 are slightly force-fitted into the complementary corners. Such irreversibility may be reinforced by providing on the bosses a transverse rib integrally moulded therewith and slightly projecting therefrom.

Another manner of reinforcing the irreversibility of the axial fitting of bosses 14 into two diagonally opposite corners of the square hole 2 can be established by providing a longitudinal rib 16 externally on at least one, and preferably on each, of the four walls $3_1$ of the socket (see FIGS. 12 and 13). Rib 16 extends along the "rear" edge of the wall considered $3_1$, the word "rear" being considered with respect to the clockwise rotational or screwing direction (arrow F, FIG. 2) when axially viewing a cross-section of the socket at the level of the wall and from the side of the socket comprising its collar 4, i.e. in the direction of arrow VII of FIG. 4.

The radial thickness of rib 16 gradually increases in the axial direction (e.g. in the direction opposite to arrow VII) from the transverse plane of the socket corresponding to the front face of threaded part 7 nearest to the collar when this part is housed at the bottom of the socket, as far as a very small distance (for example 0.3 mm) short of bosses 14. The maximum radial thickness of rib 16 is itself fairly small, for example, of the order of 0.5 mm.

The "rear" portion (with the meaning which has just been defined) of wall $3_1$ thus outwardly ribbed is itself preferably inwardly thinned-down at 12, as was described earlier with reference to FIG. 2.

The presence of the ribs 16 ensures, on the one hand, a certain angular retention of the socket at the end of its angular movement through 45° even when its bosses 14 are not yet axially seated into the corners of the square hole 2. On the other hand, however, axial retention of the socket after it has been seated is established by the endmost faces of the ribs coming into axial abutment against metal sheet 1 because of the slight radial relaxing of the tops of ribs 16 at the end of the seating manipulation.

This arrangement assumes that the axial thickness of the bosses is at least equal to that of the metal sheet 1, and is especially advantageous when these two thicknesses are equal.

In a way known per se, an annular pad (not shown in the drawing) is advantageously provided at the periphery of collar 4 for sealing the assembly.

Figure 8:
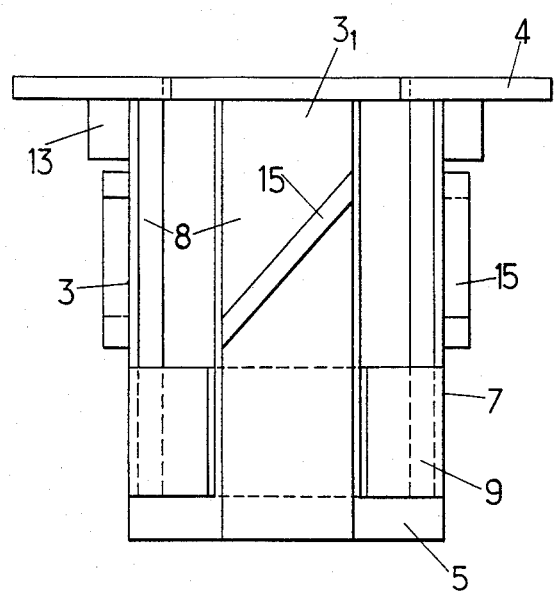
FIG. 8 shows a side view of another embodiment of the securing device of the present invention.
Figure 9:
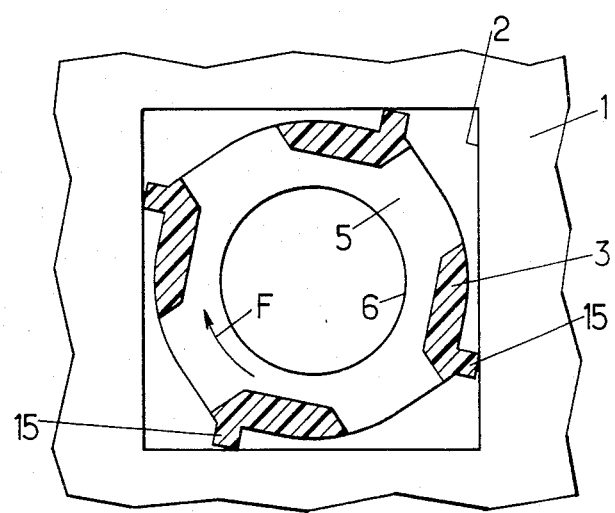
FIG. 9 is a cross-section of the cage of this device shown in the process of being fitted into a square hole.

The embodiment of FIGS. 8 and 9 differs essentially from the preceding one by the manner in which rotation through 45° of the cage and of part 7 which it contains is provided. In this embodiment it in fact becomes useless to cause the cage to rotate through 45° after its axial introduction into the square hole of the metal sheet. The angular movement in question is automatically provided during the axial introduction because of the provision of oblique ribs 15 projecting outwardly from the walls $3_1$ of the socket. During the axial introduction of the cage into square hole 2, ribs 15 come into contact with the sides of hole 2 and progressively drive the cage in the direction of arrow F in FIG. 9.

Because the outer face of each of the walls $3_1$ of the socket 3 circumferentially present a flat half and a cylindrically curved half, the oblique rib 15 projecting from the outer face is rectilinear over one-half of its extent (the half being closer to bottom 5 in FIGS. 8 and 9) and helical over its other half. The end of each rib 15 which is closest to bottom 5 is bevelled so as to facilitate its axial introduction into the square hole 2. Furthermore, the profile of each rib may have any desirable shape, for example, square-shaped as illustrated or semicircular-shaped.

The embodiment of FIGS. 10 and 11 differs essentially from the preceding ones in that the longitudinal windows cut out in the walls of the socket 3 no longer extend parallel to the axis of the socket but rather are inclined with respect to this axis so as to describe between their two axial ends an arc of 45° about the axis of the socket, as can be seen at 8A. Each of these windows 8A further jointly borders a tab 9, but in this embodiment it only comes into contact laterally with tab 9 along two radial edges A and B of tab 9 (FIG. 10).

With this embodiment, the securing functions are accomplished as follows:

First, the threaded cross-head part 7 is introduced into the cage which causes part 7 to rotate through 45° in the direction of arrow G (FIG. 11) due to the fact that its tabs 9 slide against the sides of the oblique windows 8A.

Part 7 may then be held at the bottom of the socket by cooperation with the part of appropriate roughened portions (not shown) integrally moulded with the socket. The cage containing part 7 is then fitted into the square hole 2 of the metal sheet after turning its cross-head parallel with the sides of the square. This axial introduction takes place without any angular movement. The cage may then be locked at the end of travel by the cooperation between appropriate ribs provided on the other face of the socket and the edges of hole 2.

it is then during subsequent threading turning movement of part 7 onto the complementary threaded part that part 7 automatically effects an angular movement through 45° in the direction opposite that shown by arrow G by virtue of its tabs 9 being guided by the sides of the oblique windows 8A. At the same time, part 7 is drawn axially closer to the metal sheet. At the end of the threading manipulation, tabs 9 are indeed situated opposite the areas 11 of metal sheet 1.

Whatever embodiment of the present invention is adopted, a screw-fixing device is finally provided and is particularly adapted to equip square holes in blond metal sheets or the like with threaded securing capabilities, the construction, use and advantages of such a device being sufficiently described above.

As is evident, and as it follows moreover from what has already been described above, the present invention is not limited to those of its embodiments described above. The present invention embraces, on the contrary, all variations and equivalents thereof, and more especially the following:

The collar of the cage can be axially extended by a shank coaxial with the cage on the face thereof opposite the socket. The shank forms a distance piece between the metal sheet provided with the mounting hole and the part to be fixed to the metal sheet. The shank is itself further provided with a channel for allowing one of the two threaded parts whose cooperation ensures the desired fixing to pass therethrough.

The outer surface of each of the four radial tabs 9 of the cross-head does not need to be symmetrical with respect to the diametrical axial plane passing through the solid angle of intersection (imaginary or real) of the dihedron which defines its end, but can be offset perpendicularly with respect to this plane. The contours of the windows 8 cut out in the socket to allow the tabs to jointly pass therethrough not only facilitates the angular movement of the socket after its introduction into hole 2 of metal sheet 1 in the screwing direction but also renders it difficult to effect reverse angular movement. Additionally, such construction leads to the advantageous result that an angular abutment at the end of the angular travel through 45° of the socket in the screwing direction is automatically formed.

Futher, there can be provided resilient appendices, in the bottom of the socket integrally moulded therewith and axially projecting retractably from the bottom thereof so as to push the threaded part outwardly of the socket, or more precisely, towards the hidden face of the metal sheet equipped with the socket. The appendices possibly assume the shape of rectilinear blades or of a helix, possibly converging towards the center of the socket in the manner of a pig's tail.

At least the bottom 5 of socket 3 can have a contour inscribable in an octagon different from that of the lateral surface portion of the socket intended to be axially placed at the level of the metal sheet during the angular movement through 45° of the socket. The contour of the bottom can advantageously include the same square shape and the same angular position as the contour of the crosshead so as to facilitate the axial introduction of the entire device into the square hole of the metal sheet.

We claim:

1. The combination comprising a rigid perforated sheet defining a square mounting hole and a device for securing an object by screwing to the rigid perforated sheet, said device comprising a one-piece cage which includes a threaded part adapted to be threadably coupled to a complementary threaded part by effecting relative turning movement between said threaded part and said complementary threaded part in a predetermined coupling direction, said cage including a socket having a generally prismatic shape and an octagonal base to establish a cross-sectional configuration permitting insertion of said socket into the mounting hole of the rigid perforated sheet, one end of said socket including a transversely extending collar adapted to bear on edges of said hole when said socket is inserted therein, wherein said threaded part includes four identical radial tabs extending in two diametrical directions perpendicular to each other thereby forming a cross-head, said tabs having a profile such that the cross-head defines a small clearance with said square hole, said socket adapted to be inserted with a slight play into the square hole, said socket including plural cut-out portions therein to define four identical longitudinal windows offset angularly by 90° with respect to each other and adapted to receive jointingly a respective one of the four tabs of the threaded part, and means for permitting said threaded part to rotate only through an angle of 45° in the coupling direction between a first position when said threaded part is first introduced into the square hole and a second position when at least the coupling of the complementary threaded part with said first-mentioned threaded part is terminated, wherein said means permitting rotation through only 45° includes plural lateral walls of said socket in confronting and closely-spaced relationship with a respective side of said hole when said threaded part is in said first position, each said lateral wall including means defining an engagement surface on an outer face of said lateral wall, said engagement surface defining means for engaging said respective side of said hole during turning movement of said threaded part in said coupling direction to thus permit said threaded part to be turnably moved from said first position and into said second position.

2. The combination as claimed in claim 1, wherein said means for permitting rotation through only 45° includes means establishing thinned-down portions of each said lateral wall of the socket, said thinned-down portions being inwardly flexed in response to engagement with said respective side of said hole during turning movement of said threaded part from said first position to said second position.

3. The combination as claimed in claim 1 wherein the means for permitting rotation only through 45° includes cylindrical rounded areas defined on an outer face of each said lateral wall of said socket, said rounded areas being centered on the axis of the socket and extending over half of each of said lateral walls.

4. The combination as claimed in claim 1, wherein the means for permitting rotation through 45° includes oblique ribs provided on an outer face of each of said lateral walls of the socket, said ribs cooperating with said respective side of the square hole so as to responsively drive the socket angularly during its axial insertion into said hole and to cause it to automatically rotate only through an angle of 45° during said insertion.

5. The combination as claimed in claim 1, 2, 3 or 4 wherein said collar includes at least two resiliently flexible wings bent on the side of the socket to bear resiliently against the rigid perforated sheet.

6. The combination as claimed in claim 1, 2, 3 or 4 wherein the cage includes two flat bosses each having a trapezoidal cross-section projecting axially under the collar, said bosses being introduced jointingly into two opposite corners of the square hole after the threaded part and the cage which contains it have been rotated through an angle of 45° in said coupling direction subsequent to their axial insertion into said square hole.

* * * * *

UNITED STATES PATENT AND TRADEMARK OFFICE
CERTIFICATE OF CORRECTION

PATENT NO. : 4,531,870
DATED       : July 30, 1985
INVENTOR(S) : Richard MORYL and Roger BOUERY It is certified that error appears in the above-identified patent and that said Letters Patent is hereby corrected as shown below:

The assignee should be corrected to read as follows:

--Compagnie de Materiel et d'Equipements Techniques C.O.M.E.T.--

Signed and Sealed this

Seventh Day of January 1986

[SEAL]

*Attest:*

DONALD J. QUIGG

*Attesting Officer*   *Commissioner of Patents and Trademarks*